United States Patent [19]

Jenkins et al.

[11] Patent Number: 5,017,539

[45] Date of Patent: May 21, 1991

[54] POLYMERIZATION OF BUTADIENE

[75] Inventors: Derek K. Jenkins, Southampton; Peter J. Ansell, Stirling, both of United Kingdom

[73] Assignee: Enichem Elastomers Ltd., Southhampton, United Kingdom

[21] Appl. No.: 454,917

[22] Filed: Dec. 22, 1989

[30] Foreign Application Priority Data

Dec. 22, 1988 [GB] United Kingdom ............... 8830007

[51] Int. Cl.$^5$ .................... B01J 31/00; B01J 37/00
[52] U.S. Cl. .................................... 502/102; 502/104; 502/110; 502/117
[58] Field of Search ............... 502/102, 104, 110, 117

[56] References Cited

U.S. PATENT DOCUMENTS

| 3,541,063 | 11/1970 | Throckmorton et al. | |
|---|---|---|---|
| 4,260,707 | 4/1981 | Sylvester et al. | 502/117 |
| 4,444,903 | 4/1984 | Carbonard et al. | 502/102 |
| 4,461,883 | 7/1984 | Takeuchi et al. | 502/102 |
| 4,544,718 | 10/1985 | Yeh et al. | 502/102 |
| 4,556,647 | 12/1985 | Yeh et al. | 502/102 |
| 4,575,538 | 3/1986 | Hsieh et al. | 502/102 |
| 4,699,962 | 10/1987 | Hsieh et al. | 502/117 |
| 4,791,086 | 12/1988 | Yeh et al. | 502/104 |

FOREIGN PATENT DOCUMENTS

| 1143711 | 3/1983 | Canada . |
| 0076535 | 4/1983 | European Pat. Off. . |
| 1812935 | 8/1969 | Fed. Rep. of Germany . |
| 0011184 | 5/1980 | Fed. Rep. of Germany . |
| 2101616 | 1/1983 | United Kingdom . |

Primary Examiner—H. M. S. Sneed
Assistant Examiner—James Saba
Attorney, Agent, or Firm—Cushman, Darby & Cushman

[57] ABSTRACT

A process for preparing a catalyst for the polymerization of butadiene to obtain a polymer containing a very high content of cis isomer in which a specified neodymium carboxylate, an aluminium hydrocarbyl or aluminium hydrocarbyl hydride and a source of halogen are contacted using a particular procedure.

10 Claims, No Drawings

POLYMERIZATION OF BUTADIENE

This relates to a process for preparing a catalyst for the polymerization of butadiene capable of producing a polymer containing a very high content (98 or more) of cis isomer.

Polybutadienes containing high contents of cis isomer (e.g. 93-97%) have been manufactured for many years by solution polymerization using a coordination catalyst, usually one containing a titanium, vanadium or nickel compound. Recently polybutadienes containing even higher contents of cis isomer (98% or more) have been manufactured using so-called rare earth based coordination catalysts. Such catalysts are usually formed from a neodymium compound, an organo aluminium cocatalyst and a source of halogen. Neodymium carboxylates have proved to be very effective in such catalysts.

We have now found that by careful choice of neodymium component of the catalyst and by strictly adhering to a particular procedure for preparing the catalyst, improvements in the polymerisation process may be obtained.

According to the present invention a process for preparing a catalyst for the polymerisation of butadiene comprises contacting in hydrocarbon solvent (a) an aluminium hydrocarbyl (other than aluminium triethyl) or an aluminium hydrocarbyl hydride, (b) neodymium neodecanoate (neodymium versatate) or neodymium naphthenate and (c) a source of halogen, the contacting and subsequent mixing being carried out at a temperature of $-15°$ C. to $-60°$ C., and ageing the catalyst for a period of at least 8 hours before use in polymerisation.

Preferably the preformed catalyst is homogeneous and readily soluble in hydrocarbons. Advantageously the catalyst is preformed in the presence of a small amount of butadiene monomer.

Neodymium neodecanoate (neodymium versatate) is the neodymium salt of a synthetic acid comprising a mixture of highly branched isomers of C10 monocarboxylic acids, (hereinafter called "Versatic Acid"). The acid is sold under this trade name by Shell Chemicals. The neodymium salt, ("versatate"- $Nd(C_9H_{19}COO)_3$), or neodymium naphthenate may be obtained from a neodymium compound, conveniently a water soluble neodymium salt (e.g. neodymium trichloride) or neodymium oxide ($Nd_2O_3$).

The aluminium hydrocarbyl or hydrocarbyl hydride (component (a)) preferably contains alkyl groups having 3 to 10, more preferably 3 to 5, carbon atoms. Preferred examples are diisobutyl aluminium hydride and aluminium triisobutyl.

The source of halogen may be an aluminium alkyldihalide, aluminium dialkyl halide, an aluminium alkyl sesquihalide, an organic halogen compound, such as benzoyl chloride, t-butyl chloride, methyl chloroformate or benzyl chloride or an inorganic compound containing Cl or Br in ionisable form, such as HCl or HBr. Examples of aluminium alkyl halides are ethyl aluminium dichloride, diethyl aluminium chloride and ethyl aluminium sesquichloride.

The quantities of the various catalyst components are preferably chosen so as to give an aluminium:neodymium atomic ratio of at least 10:1, more preferably 15:1 to 200:1 and a halogen:neodymium atomic ratio of 0.5:1 to 5:1. Optimum ratios are readily determined empirically in separate experiments.

Preferably the catalyst is prepared or preformed using the order of addition hydrocarbon solvent, component (a), component (b), component (c). If prepared in the presence of butadiene monomer, the diene is dissolved in hydrocarbon solvent and the components added in the order (a), (b), (c).

The hydrocarbon solvent used in the preparation is preferably a straight chain hydrocarbon such as hexane or a cycloalkane such as cyclohexane. Mixtures of hydrocarbons may be used.

The temperature at which the catalyst components are brought into contact in hydrocarbon solvent is an important part of the catalyst preparation procedure. The contacting and subsequent mixing is carried out at a temperature of $-15°$ C. to $-60°$ C. Preparation at this temperature increases catalyst activity compared with preparation at ambient temperatures or above (e.g. $+40°$ C.).

After contacting and mixing at a temperature of $-15°$ C. to $-60°$ C., preferably $-20°$ C. to $-40°$ C., the catalyst premix is aged for a period of at least 8 hours. Ageing for several days before use, e.g. 7 days, may not be deleterious and may in fact increase catalyst activity but beyond about 7 days activity starts to decline. Polymer molecular weight may also be increased by ageing for long periods. Ageing may be carried out at the same temperatures as used for the premixing procedure. Temperatures up to slightly above ambient (e.g. $+40°$ C.) may be used for the ageing but the catalyst may become unstable so low temperature ageing at below 0° C. is preferred, preferably at $-20°$ C. to $-40°$ C.

Polymerisation is preferably carried out in the same hydrocarbon solvent as used in the catalyst preparation. Reaction in the absence or substantial absence of solvent is however possible.

The amount of catalyst component (b) used in the polymerisation is e.g. 0.05 mMole per Group III Metal/100 g of monomer or more. Usually 0.10 mMole-0.26 mMole Nd/100 g of monomer is sufficient.

Polymerisation may be carried out at a temperature of zero (0° C.) to moderately elevated temperature (e.g. 200° C.) or above, preferably 20° C. to 100° C. Under optimum conditions cis contents of 98% or more are attainable.

By the process of the present invention it is possible to enhance the activity of the catalyst, offering opportunities for reduced catalyst consumption in the polymer manufacturing process and thus improved process economics. Furthermore it is possible to improve the molecular weight/molecular weight distribution characteristics of the polybutadiene product. In general polybutadienes prepared by the process of the present invention have a narrower molecular weight distribution than ones obtained using a different neodymium component as component (a) and/or higher premixing temperatures. This is particularly important since molecular weight distribution is well known to have a significant influence upon the processing characteristics of synthetic rubbers. The processing characteristics are of crucial importance to the rubber product manufacturer, especially tire manufacturers.

It is important to note that the catalyst of the present invention is homogeneous and hydrocarbon soluble and, in one embodiment, is prepared from a soluble neodymium component, itself prepared from neodymium oxide. Such catalysts are different from heterogeneous catalysts prepared from an insoluble rare earth compound, and display quite different reaction kinetics/process behaviour. Because of these differences it was quite unpredictable that, by following the preparation procedure of the invention, enhanced catalyst activity and/or improved molecular weight/molecular weight distribution characteristics of the polybutadiene product might be obtainable.

The following Examples illustrate the invention.

EXAMPLES 1-8

In these Examples neodymium versatate (NdV) or neodymium naphthenate (NdN) was used as the neodymium component (b) of the catalyst as 0.2 M [Nd] solutions in hexane. The versatate was prepared from Versatic 10 (ex Shell Chemicals).

A series of catalysts was prepared in oven dried (130° C.) crown capped half pint bottles using the premixing and ageing conditions shown in the table.

All reagents were dispensed by syringe and the catalyst components were added in the following order:
  (i) Hexane, dried by distillation from butyl lithium under nitrogen, to give final [Nd] of 0.022 M;
  (ii) Diisobutyl aluminium hydride (ex Aldrich Chemical Co., as supplied).

The bottle and contents were allowed to equilibrate at the desired temperature.
  (iii) NdV or NdN. The bottle was kept at the required temperature for 1 hour (20° C. or 40° C.) or 2.5 hours (−30° C.) before adding:
  (iv) t-Butyl chloride, distilled from freshly dried alumina and diluted to 0.5 M in hexane.

Catalyst component molar ratios were such as to give atomic ratios of Al:Nd:Cl of 20:1:3 in all cases.

The catalyst was then kept at the same temperature for 1 hour and aged as indicated before use.

Polymerisations were carried out in 1 pint crown capped bottles at 60° C. for 240 minutes using a standard recipe:

| Hexane | 350 ml |
| 1,3 Butadiene | 45 g |
| Catalyst | 0.15 mM Nd/100 g monomer |

Reaction was stopped by venting off excess butadiene, adding hexane containing antioxidant and coagulating with methanol. Polymers were dried at 50° C. under vacuum and the conversion calculated from the weight of polymer obtained. In all cases substantially 100% conversion of polymer was obtained after 240 minutes reaction.

The Intrinsic Viscosity (IV) of each polymer was measured on 0.1% (w/v) solutions in toluene at 30° C., and using GPC, the weight average molecular weight (Mw), number average molecular weight (Mn) and the molecular weight distribution (MWD) characteristics for each were determined.

The results are indicated in the table. By comparison of the Examples according to the invention (Examples 2, 4 and 6) with the control Examples (Examples 1, 3 & 5), the advantages of using the low temperature premixing process of the present invention can be seen from the lower values for I.V., Mw and MWD for the products obtained in Examples 2, 4 & 6.

In addition separate experiments showed that the catalyst preparation procedure of Examples 2, 4 & 6, (premixes made at −30° C. and aged at −20° C.) gave catalysts of increased activity, especially after ageing for 7 days. Premixes made at −30° C. but aged at +20° C. were all more active than comparison premixes made at +20° C. and the activity increased with ageing time. In general, versatate catalysts were more active than naphthenate catalysts, when prepared at −30° C.

Comparison Examples 7 and 8 show that premixing at +40° C. and aging at 20° C. gives very high weight average molecular weights (Mw) and, in the case of Example 7, a broader molecular weight distribution. In addition the catalysts were less active than the control examples.

Thus, in general, catalysts prepared by premixing at −30° C. and aging at −20° C. give lower overall molecular weights and the narrowest molecular weight distributions, and exhibit increased activity compared with catalysts prepared at ambient temperature (20° C.) or slightly above (40° C.).

It should be noted that neodymium naphthenate is not very soluble in hexane at −30° C., but neodymium versatate gives a clear solution at this temperature. This, coupled with the advantage of much increased activity which is obtained with neodymium versatate, by preforming at low temperature and aging, offers the possibility of a particularly advantageous polymerisation process.

| Ex | Nd salt | Preparation Conditions | IV | Mw × 10⁻³ | Mn × 10⁻³ | MWD |
|---|---|---|---|---|---|---|
| 1* | NdV | Premix 20° C. Aged at 20° C. for 20 hrs. | 2.36 | 328 | 110 | 3.25 |
| 2 | NdV | Premix −30° C. Aged at −20° C. for 20 hrs. | 1.77 | 207 | 77 | 2.68 |
| 3* | NdV | Premix 20° C. Aged at 20° C. for 7 days | 3.08 | 417 | 124 | 3.37 |
| 4 | NdV | Premix −30° C. Aged at −20° C. for 7 days. | 1.98 | 311 | 101 | 3.07 |
| 5* | NdN | Premix 20° C. Aged at 20° C. for 7 days. | 3.30 | 465 | 113 | 4.10 |
| 6 | NdN | Premix −30° C. Aged at −20° C. for 7 days. | 2.77 | 368 | 121 | 3.05 |
| 7* | NdV | Premix 40° C. Aged at 20° C. for 20 hrs. | 2.64 | 389 | 103 | 3.78 |
| 8* | NdV | Premix 40° C. Aged at 20° C. for 7 days. | 2.40 | 415 | 138 | 3.01 |

*comparison Examples.

We claim:

1. A process for preparing a catalyst for the polymerisation of butadiene comprising contacting in hydrocarbon solvent (a) an aluminum hydrocarbyl (other than aluminium triethyl) or an aluminium hydrocarbyl hydride, (b) neodymium neodecanoate or neodymium naphthenate and (c) a source of halogen, the contacting and subsequent mixing being carried out at a temperature of −15° C. to −60° C., and ageing the catalyst for a period of at least 8 hours at −20° C. to −40° C. before use in polymerisation.

2. A process according to claim 1 wherein the catalyst is prepared using the order hydrocarbon solvent, component (a), component (b), component (c).

3. A process according to claim 1 or claim 2 wherein the catalyst is prepared using neodymium neodecanoate as component (b).

4. A process according to any one of claims 1 to 3 wherein the catalyst is prepared at −20° C. to −40° C.

5. A process for preparing a catalyst for the polymerisation of butadiene comprising contacting in hydrocarbon solvent (a) an aluminium hydrocarbyl (other than aluminium triethyl) or an aluminium hydrocarbyl hydride, (b) neodymium neodecanoate or neodymium naphthenate and (c) a source of halogen, the contacting and subsequent mixing being carried out at a temperature of $-15°$ C. to $-60°$ C., and ageing the catalyst for a period of at least 8 hours at $-20°$ C. to $-40°$ C. before use in polymerisation, wherein the catalyst is prepared using the order hydrocarbon solvent, component (a), component (b), component (c).

6. A process according to claim 5 wherein the catalyst is prepared using neodymium neodecanoate as components (b).

7. A process according to any one of claims 5 and 6 wherein the catalyst is prepared at $-20°$ C. to $-40°$ C.

8. A process for preparing a catalyst for the polymerisation of butadiene comprises contacting in hydrocarbon solvent (a) an aluminium hydrocarbyl (other than aluminium triethyl) or an aluminium hydrocarbyl hydride, (b) neodymium neodecanoate or neodymium naphthenate and (c) a source of halogen, the contacting and subsequent mixing being carried out at a temperature of $-20°$ C. to $-40°$ C., and ageing the catalyst for a period of at least 8 hours at $-20°$ C. to $-40°$ C. before use in polymerisation.

9. A process according to claim 8 wherein the catalyst is prepared using the order hydrocarbon solvent, component (a), component (b), component (c).

10. The process according to claim 8 or claim 9 wherein the catalyst is prepared using neodymium neodecanoate as component (b).

* * * * *